UNITED STATES PATENT OFFICE.

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA.

VENTILATION OF DYNAMO-ELECTRIC MACHINES.

1,395,347.     Specification of Letters Patent.     Patented Nov. 1, 1921.

Application filed September 28, 1917. Serial No. 193,714.

*To all whom it may concern:*

Be it known that I, ROY A. MCCARTY, a citizen of the United States, and a resident of Wilkinsburg, in the county of Allegheny and State of Pennsylvania, have invented a new and useful Improvement in Ventilation of Dynamo-Electric Machines, of which the following is a specification.

My invention relates to the ventilation of dynamo-electric machines and particularly to the ventilation of machines that are arranged in side by side relationship, with their rotatable members mounted upon the same shaft, as is customary in motor-generator and frequency changer sets.

The object of my invention is to provide a system of ventilation for machines of the above indicated type in which a continuous supply of cool ventilating air shall be supplied to each machine, irrespective of the operating temperature of the other machine or machines of the set.

In the operation of motor-generator sets, it has been found that the air discharged from one or more of the machines is liable to be drawn into another machine forming a part of the same set, thereby increasing its operating temperature. Furthermore, the heated air that is discharged from any machine is liable to contain a certain amount of foreign matter, particularly if the air currents pass over the shaft bearing that is usually interposed between the two machines. It is obvious that air currents, so laden with foreign matter, will prove injurious to any machine if taken directly into its ventilating system.

By my invention, I provide means for preventing any interchange of heated air between the machines and, furthermore, insure that a continuous supply of fresh ventilating air shall be delivered at those points where the heated air currents have heretofore entered.

Figure 1:
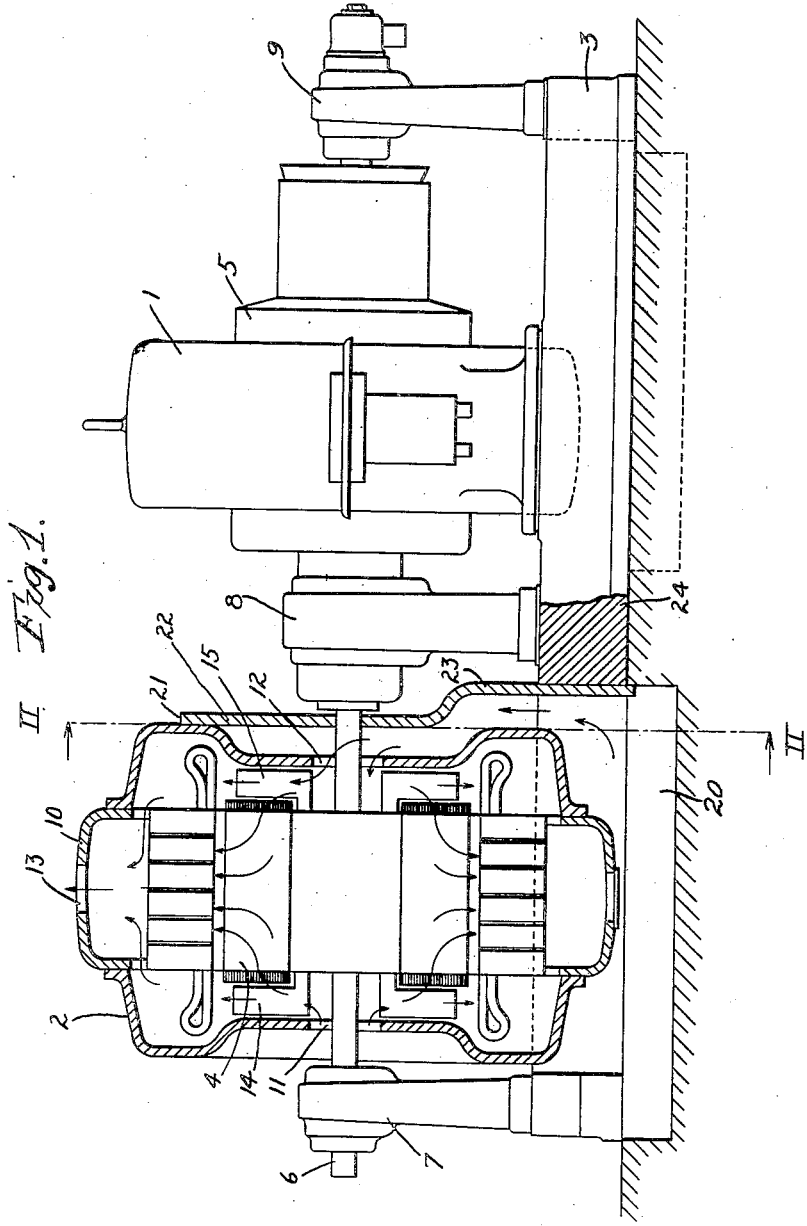
Figure 2:
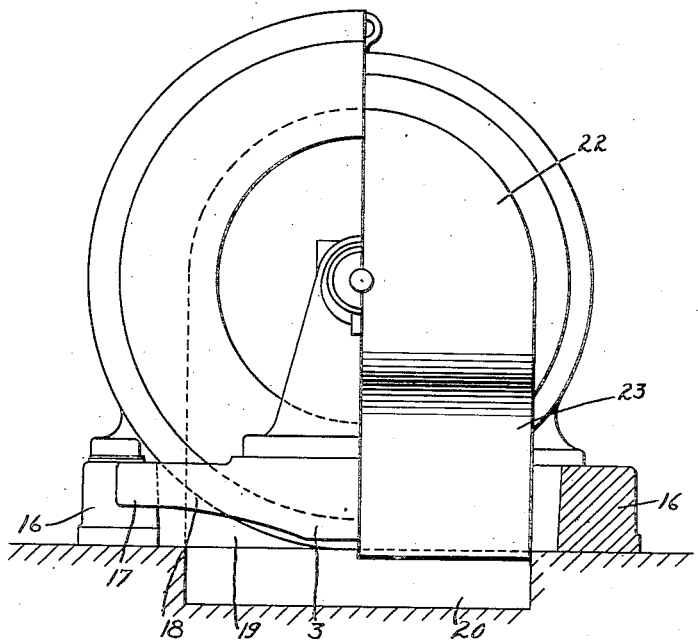

In the accompanying drawings, Figure 1 is a view, partially in section and partially in side elevation, of a motor-generator or frequency-changer set embodying my invention, and Fig. 2 is a view, partially in section along the lines II—II of Fig. 1, and partially in end elevation.

A motor or generator 1, and a generator or motor 2 are arranged, in side-by-side relation, on a bed plate 3, with their rotatable members 4 and 5 respectively mounted upon a shaft 6 that is rotatably supported in pedestal bearings 7, 8 and 9.

The generator 2 is provided with an inclosing casing 10, the end portions of which are provided with inlet openings 11 and 12, surrounding the shaft 6, and the peripheral portion of which is provided with outlet openings 13. The rotatable member 4 is provided, at its ends, with a plurality of sets of fan blades 14 and 15 that are adapted to draw air into the inlet openings 11 and 12, respectively.

Referring now to Fig. 2, the bed plate 3 comprises spaced parallel side portions 16 that are respectively provided, at their ends, with seats 17. A bridge member 18, for supporting the pedestal bearing 7, is supported, at its ends, in the seats 17. The bridge member 18 is provided with tapered end portions, thereby providing openings 19 that respectively communicate with the space between the side portions 16 of the bed plate 3 and a chamber 20 that is provided in the floor beneath the generator 2. A barrier member 21 is interposed between the pedestal bearing 8 and the casing 10 of the generator 2 and comprises a substantially semi-cylindrical portion 22 that is in engagement with the casing 10, and a substantially rectangular portion 23 that is offset with respect to the portion 22 and extends downwardly into the chamber 20 and is in engagement with a bridging portion 24 that is integral with the bed plate 3.

From the foregoing, it is apparent that, when the rotatable member 4 of the generator 2 is driven by the motor 1, the sets of fan blades 14 and 15 draw air into the inlet openings 11 and 12, respectively. The air entering the opening 11 is taken directly from the outside atmosphere surrounding the shaft 6, while the air delivered to the opening 12 is taken from the outside atmosphere from below the shaft 6. The fan 15 then draws the air beneath the end portions of the bridge member 18 into the chamber 20 below the generator from whence it passes upwardly between the barrier member 21 and the end portion of the casing 10. Cool ventilating air will thus be supplied to both ends of the machine without interference from the heated air currents delivered by the motor, which I have shown as of the open-ventilated type, without an inclosing casing.

While I have shown my invention in a simple and preferred form and as applied to only one of the two machines, it is not so limited but is susceptible of being applied to both machines, and I desire, therefore, that only such limitations shall be imposed as come within the scope of the appended claims.

I claim as my invention:

1. In a system of ventilation, the combination with a plurality of dynamo-electric machines mounted in side-by-side relation, one of said machines being provided with an inclosing casing having axial depressions therein, and means for drawing air into the respective ends of said casing, of a baffle member located intermediate said machines and partially closing one of said depressions for preventing heated air from the other of said machines from entering the adjacent end of said first-named machine.

2. In a system of ventilation, the combination with a plurality of dynamo-electric machines mounted in side-by-side relation, one of said machines being provided with an inclosing casing having axial depressions therein, and means for drawing air into the respective ends of said casing partially closing one of said depressions and extending into said passage, of means, comprising a passage under said machine and a baffle located intermediate said machines, for preventing heated air from the other of said machines from entering the adjacent end of said first-named machine.

3. In a system of ventilating for dynamo-electric machines, the combination of a plurality of separate dynamo-electric machines mounted in side-by-side relation, a casing for one of said machines formed with axial depressions, air-inlet openings in said depressions and air-outlet openings in the periphery of said casing, an air passage adjacent the machines, a baffle plate coöperating with one of said depressed portions of the casing and extending into said air passage to form a communication therebetween, and means for causing a circulation of air through said system.

4. In a system of ventilation, the combination of a plurality of separate dynamo-electric machines mounted in side-by-side relation, a casing for one of said machines formed with axial depressions and having air-inlet and outlet openings therein, an air passage adjacent said machines, a substantially vertically disposed baffle plate arranged between said machines extending into said air passage and engaging the said casing at the upper portion thereof so as to partially close said depression and being offset adjacent the lower edge of said depression to form an opening connecting the air passage with the interior of said casing, and means for causing circulation of air through said system.

5. In a dynamo-electric machine, an inclosing casing, and a system of ventilation comprising means for causing air to enter both sides of said casing and means for causing said air to be drawn from one side only of said machine, said last-mentioned means comprising a baffle member mounted externally of one side of said casing and forming an air chamber therewith and an air passage disposed underneath said casing and communicating with said chamber.

6. In a dynamo-electric machine, an inclosing casing, and a system of ventilation comprising air-agitating means disposed within said casing, means for admitting air from both sides of said casing, and means for causing all of the air admitted to be drawn from a single predetermined location comprising a baffle member mounted externally of one side of said casing and forming an air chamber therewith, and an air passage communicating therewith.

In testimony whereof, I have hereunto subscribed my name this 14th day of Sept., 1917.

ROY A. McCARTY.